(12) United States Patent
Scheurer et al.

(10) Patent No.: US 8,914,152 B2
(45) Date of Patent: Dec. 16, 2014

(54) METHOD FOR COLLISION-FREE PATH PLANNING OF AN INDUSTRIAL ROBOT

(75) Inventors: Christian Scheurer, Augsburg (DE);
Uwe Zimmermann, Augsburg (DE)

(73) Assignee: KUKA Laboratories GmbH, Augsburg (DE)

( * ) Notice: Subject to any disclaimer, the term of this patent is extended or adjusted under 35 U.S.C. 154(b) by 646 days.

(21) Appl. No.: 13/018,493

(22) Filed: Feb. 1, 2011

(65) Prior Publication Data
US 2011/0196533 A1    Aug. 11, 2011

(30) Foreign Application Priority Data

Feb. 10, 2010 (DE) .......................... 10 2010 007 458

(51) Int. Cl.
*G05B 19/04* (2006.01)
*B25J 9/16* (2006.01)
*G05B 19/18* (2006.01)

(52) U.S. Cl.
CPC .................................... *B25J 9/1666* (2013.01)
USPC ......................................... 700/255; 700/250

(58) Field of Classification Search
USPC ......... 700/159, 245, 253, 254, 255, 258, 259, 700/264, 61, 86, 97, 98; 901/1, 2, 14, 3, 901/332, 42, 46, 47, 9
See application file for complete search history.

(56) References Cited

U.S. PATENT DOCUMENTS

| | | | |
|---|---|---|---|
| 4,954,762 A | 9/1990 | Miyake et al. | |
| 7,272,524 B2 * | 9/2007 | Brogardh | 702/95 |
| 7,782,451 B2 * | 8/2010 | Matsumoto et al. | 356/237.2 |
| 7,877,225 B2 * | 1/2011 | Sedlmayr | 702/152 |
| 2009/0118864 A1 * | 5/2009 | Eldridge et al. | 700/259 |
| 2011/0010009 A1 * | 1/2011 | Saito | 700/253 |

FOREIGN PATENT DOCUMENTS

| | | |
|---|---|---|
| CN | 1883887 A | 12/2006 |
| EP | 0 439 655 A1 | 8/1991 |

OTHER PUBLICATIONS

Adolphs et al; "Collision-free real-time path-planning in time varying environment"; Proceedings of the 1992 IEEE/RSJ International Conference on Intelligent Robots and Systems; Jul. 7-10, 1992; pp. 445-452.

Chinese Patent Office; Search Report in Chinese Patent Application No. 2011100377269 dated Mar. 25, 2014; 2 pages.

* cited by examiner

*Primary Examiner* — Ian Jen
(74) *Attorney, Agent, or Firm* — Wood, Herron & Evans, LLP

(57) ABSTRACT

The invention relates to a method for collision-free path planning for an industrial robot (1) which has a control device (9) and a robot arm (2) that is movable with the aid of the control device (9), to which an object (11) is attached, and in whose working space at least one obstacle (12) is situated.

10 Claims, 7 Drawing Sheets

METHOD FOR COLLISION-FREE PATH PLANNING OF AN INDUSTRIAL ROBOT

Figure 1:
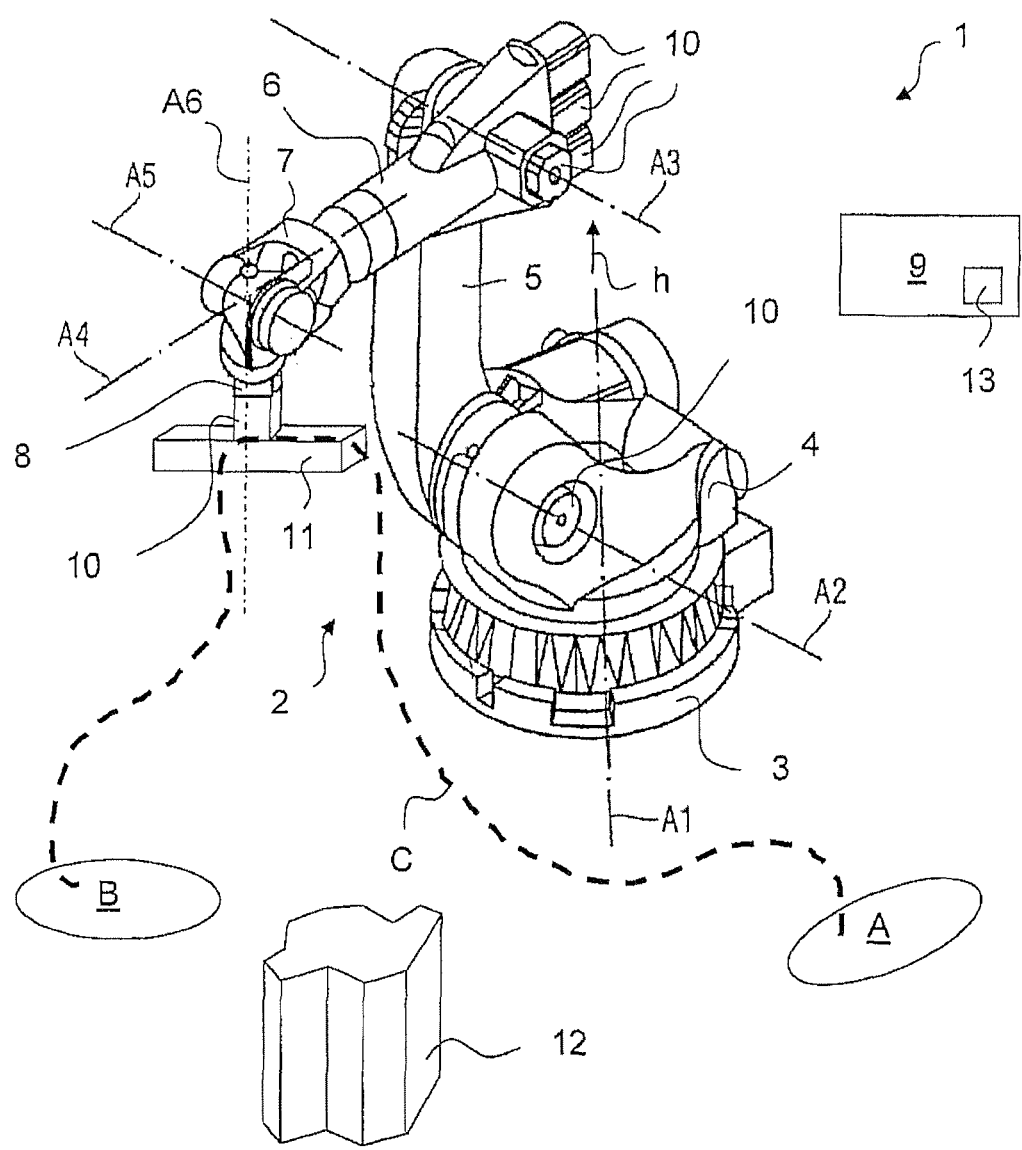

The invention relates to a method for collision-free path planning for an industrial robot.

Industrial robots are working machines which are equipped with tools for automatic handling and/or processing of objects, and are programmable in a plurality of motion axes, for example with regard to orientation, position and process sequence. Industrial robots usually have a robot arm with a plurality of axes and programmable controllers (control devices), which control or regulate the motion sequences of the industrial robot during operation.

In order to perform the motion, the controller is able to plan this motion with the aid of path planning.

When operating the industrial robot, it is desired that the latter not collide with an object. If a load is moved with the aid of the industrial robot, as is the case for example with logistics applications, then the load being moved also should not collide with an obstacle. The motion of the industrial robot should therefore be planned accordingly.

P. Adolphs et al disclose, in "Collision-free real-time path-planning in time varying environment," *Proceedings of the 1992 IEEE/RSJ International Conference on Intelligent Robots and Systems*, Jul. 7-10, 1992, pp. 445-452, a method for modeling moving objects in the three-dimensional configuration space of an articulated arm industrial robot. The method is based on a look-up table that includes a link between an object in the working space and a corresponding collision-free region in the configuration space. The configuration space is described in cylindrical coordinates.

The object of the invention is to specify an improved method for collision-free path planning.

The object of the invention is fulfilled by a method for collision-free path planning for an industrial robot which has a control device and a robot arm that is movable with the aid of the control device, to which an object is attached, and in whose working space at least one obstacle is situated, having the following procedural steps:

creation of a three-dimensional model in cylindrical coordinates of the working space of the industrial robot, based on a three-dimensional CAD model of the working space with modeled obstacle, by modeling the modeled obstacle in the three-dimensional model using at least one hollow cylindrical first segment, dividing the region of the three-dimensional model that is not occupied by a first segment into a plurality of hollow cylindrical and/or cylindrical second segments, and determination of a path on which the industrial robot is to move the object from a starting point to an end point, such that the object is moved exclusively within the second segments.

A further aspect of the invention relates to an industrial robot having a control device and a robot arm that is movable with the aid of the control device, to which an object is attached, and in whose working space at least one obstacle is situated, the control device being set up to move the robot arm in such a way that the object moves from a starting point to an end point along a path, and the control device being set up to determine the path according to the method according to the invention.

According to the method according to the invention, the three-dimensional model will first be created, which is described in cylindrical coordinates, i.e., based on a coordinate system that includes an angular axis, a radius axis and a vertical axis, or to which the coordinates angle ($\phi$), radius ($r$) and height ($h$) are assigned. In order to avoid a collision between the object that is to be moved from the starting point to the end point using the industrial robot and an obstacle, the motion planning is based on the three-dimensional model of the working space of the industrial robot. The working space in this case is the space into which the industrial robot is able to move with its robot arm, i.e., the space within which the industrial robot is able to move the object.

In the working space there is at least one obstacle, with which the object is not to collide while in motion. In order to prevent that, according to the invention the obstacle is approximated in the three-dimensional model as at least one hollow cylindrical segment. This approximation is made on the basis of the CAD model, which in particular models the working space of the industrial robot, and thus also the obstacle, relatively precisely. In particular, the size of the first segment, or of the plurality of first segments, is chosen so that it includes the entire obstacle.

Next, the regions of the cylindrical model that are not occupied by an obstacle are divided into a plurality of second segments. Since these are not occupied by an obstacle, it is now possible to lay out the path on which the industrial robot is to move the object within these second segments.

The collision-free path planning according to the invention thus takes place in a cylindrical working space in particular of a 6-axis industrial robot, and accordingly is relatively well suited for applications in the fields of logistics (palletting/depalletting), handling and other pick-&-place tasks.

Preferably, the origin of the cylindrical coordinate system assigned to the cylindrical coordinates of the model is placed at the center point of the industrial robot.

The robot arm of the industrial robot used preferably includes a base, a carousel mounted relative to the base so that it is rotatable around an axis running vertically, a motion link, an extension arm, and a robot hand, in particular multiaxial, having a flange to which the object is attached at least indirectly, for example with the aid of a gripper attached to the flange. The vertical axis of the cylindrical coordinate system assigned to the cylindrical coordinates of the model can then preferably be placed in the axis of the robot arm. The axis around which the carousel rotates is normally designated as axis 1.

This variant of the method according to the present invention may have the advantage that robot paths can be planned having in particular as short a cycle time as possible, since the cylindrical search space (three-dimensional model) is designed giving preference to motions of axis 1.

In addition, with this approach a so-called palletting mode can be dispensed with in the case of a 6-axis robot, since the orientation of the object being moved may be planned in advance, and even any tilting motions of the object may be included. This flexibility enables new possibilities particularly during palletting, such as vertical package placement on the pallet, which has not been able to be fully utilized in the past, and is advantageous for example in automatic planning of handling applications.

To at least reduce the danger of a collision of the robot arm with the obstacle while the object is being moved, if not to eliminate it altogether, the method according to the invention, according to a preferred embodiment, has the following procedural steps in addition:

simulation in the three-dimensional model of positions of the robot arm for positions of the object assigned to the second segments, determination in the three-dimensional model of the second segments for which a collision of the robot arm with the obstacle exists, and categorization of those second segments for which a collision of the robot arm with the obstacle has been found, as third segments.

Hence those second segments, i.e., segments of the three-dimensional model that are not "occupied" by the obstacle, are sought, in which the robot arm would collide with the obstacle when the object passes through. When these segments have been determined, i.e., the third segments, then they are not used for planning the path, since the planning of the path is based after all only on the second segments.

In order to determine whether one of the second segments may be assigned to a collision of robot arm and obstacle, i.e., whether it is categorized as a third segment, a sampling-based method or an adaptive method for example may be used.

With both methods of collision testing, for example a plurality of positions are determined for the object in an initially free segment, i.e., a second segment, and are moved to in a simulation running for example on the control device of the industrial robot.

For the collision test using the sampling-based method, for example a plurality of positions of the object are defined within the relevant second segment, and the corresponding robot arm positions are simulated. If a collision of the robot arm with the obstacle results for at least one of these positions, this second segment is categorized as a third segment. Otherwise this second segment remains a second segment.

With the adaptive method, distance information is used to mark parts of a second segment as guaranteed collision-free insofar as possible. That procedure is continued until either the entire questionable second segment has been proven collision-free or a part of the segment remains that one does not wish to divide further (implementation details), so that this part of the segment is declared to be subject to collision.

In order to obtain the path, a segment path may first be determined from adjacent second segments assigned to the path, and the path calculated based on the segment path.

The planning of the path is based for example on a so-called A* search within the three-dimensional model, in order to find for example the shortest or most cost-effective segment path between the starting point and the end point. According to this variant, the path is then computed from this segment path, for example using point-to-point calculation. This calculation, which is thus based on the model, guarantees collision-free motion of the object along the path. Smoothing may also be used for calculating the path from the segment path, for example in order to obtain the largest possible smoothed contour.

The object may be moved along the path with its orientation unchanged, in which case the model is assigned to that orientation. Depending on the orientation of the object, the latter has a different spatial alignment, resulting in particular in the development of different distributions of third segments.

If the object is moved along the path initially with a first orientation and then with a second orientation that differs from the first orientation, as provided according to one variant of the method according to the invention, then according to another embodiment of the method according to the invention two three-dimensional models may be created, of which a first model is assigned to the first orientation and a second model to the second orientation. Hence it is possible to also rotate the object without collision while moving it.

In order to also ensure that the object does not collide with the obstacle during rotation of the object from the first orientation to the second orientation, there may be provision to rotate the object in a region of the working space that is assigned to a second segment, or to a plurality of connected second segments that is large enough so that the object is rotatable from the first to the second orientation within this second segment or plurality of second segments without leaving the relevant second segment or plurality of second segments.

Figure 2:
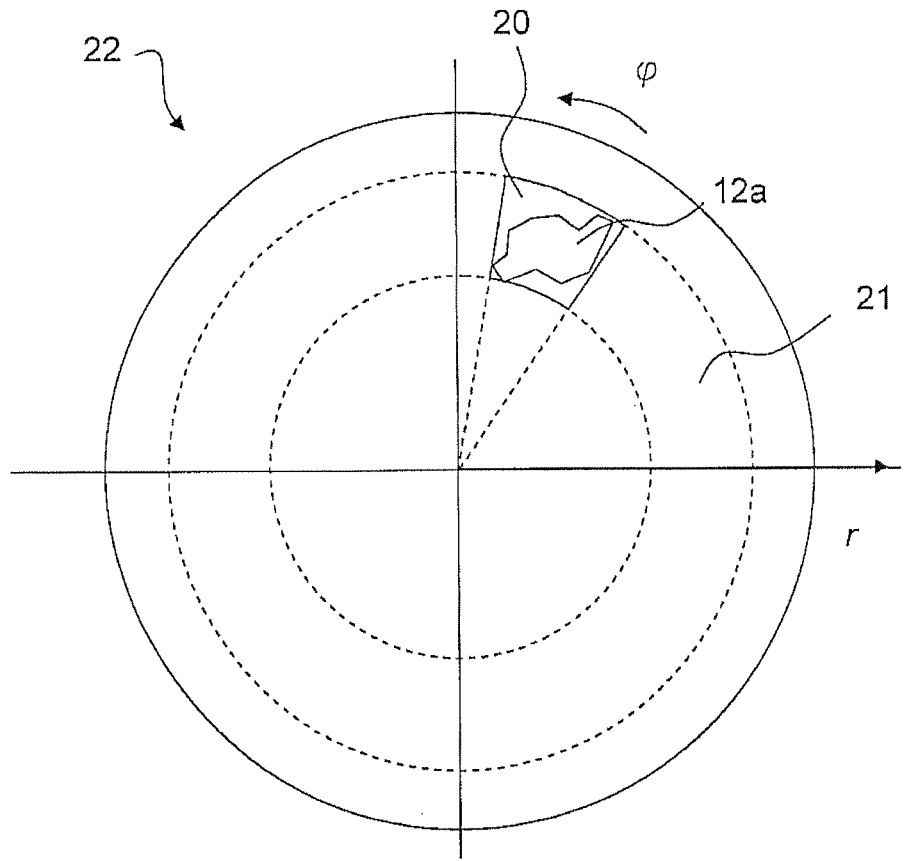
Figure 3:
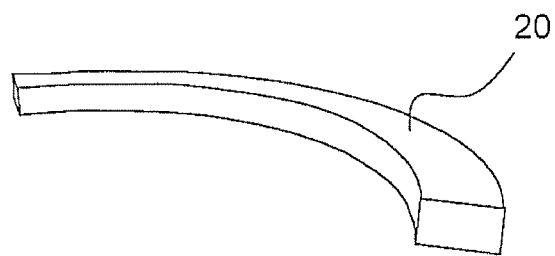
Figures 4A, 4B, 4C:
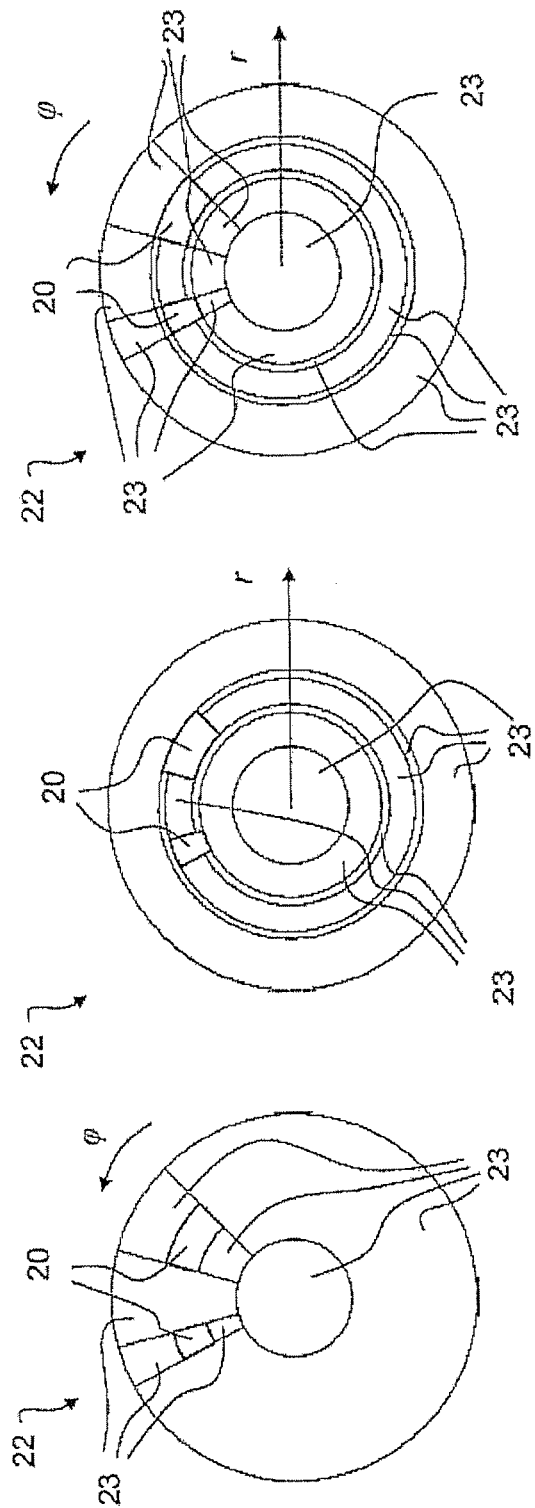
Figure 5:
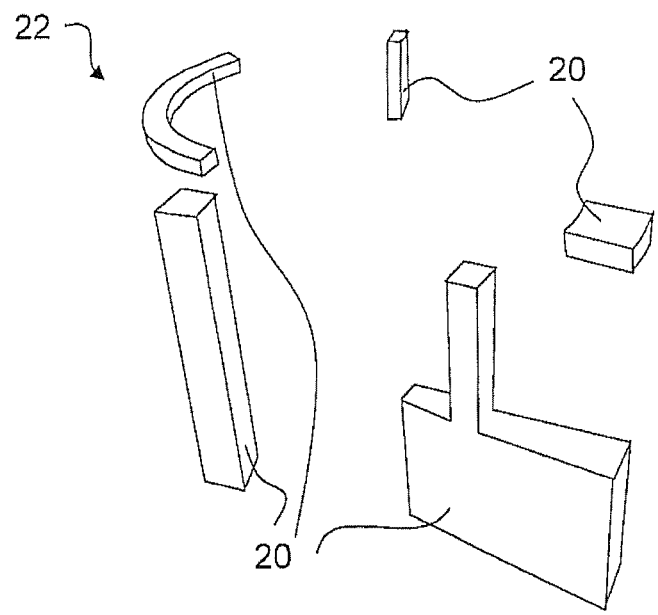
Figure 7:
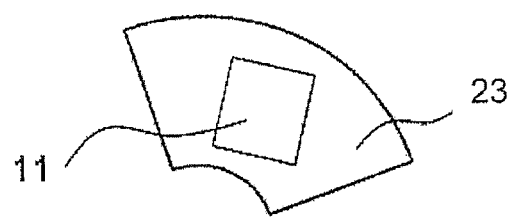
Figure 6:
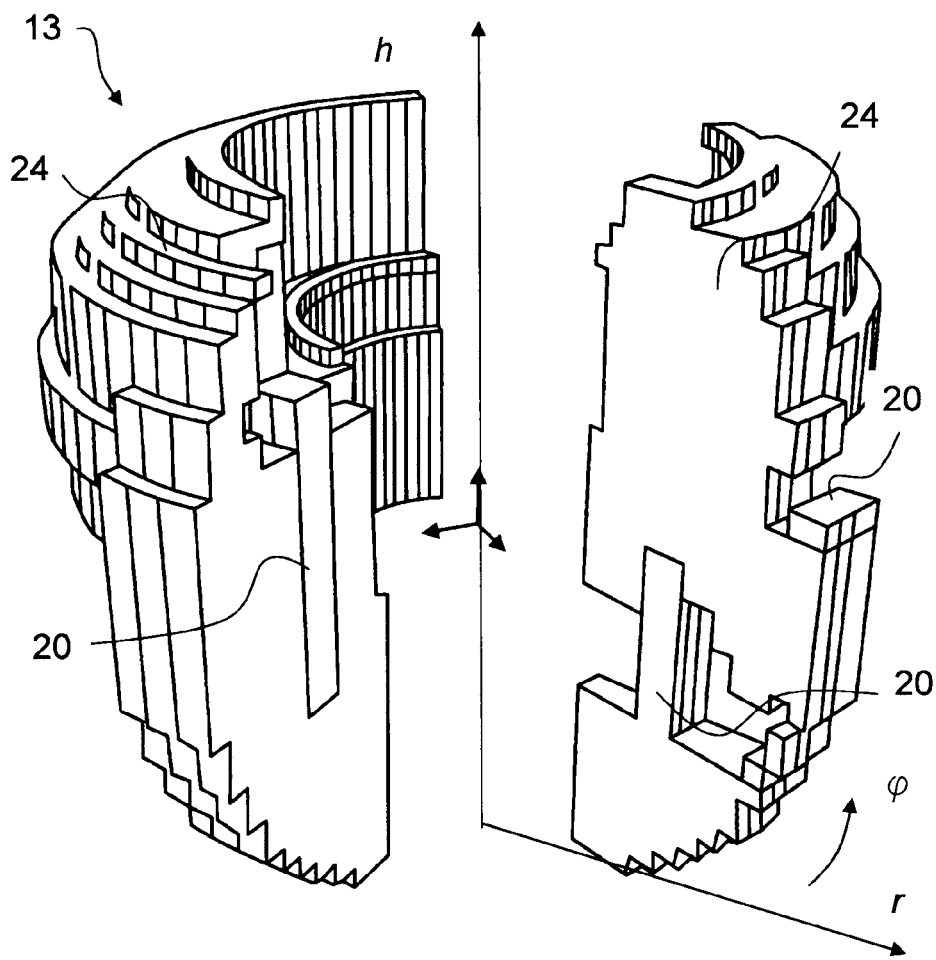
Figure 8:
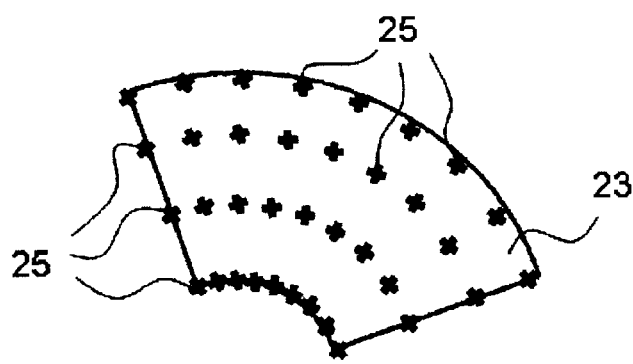
Figure 9:
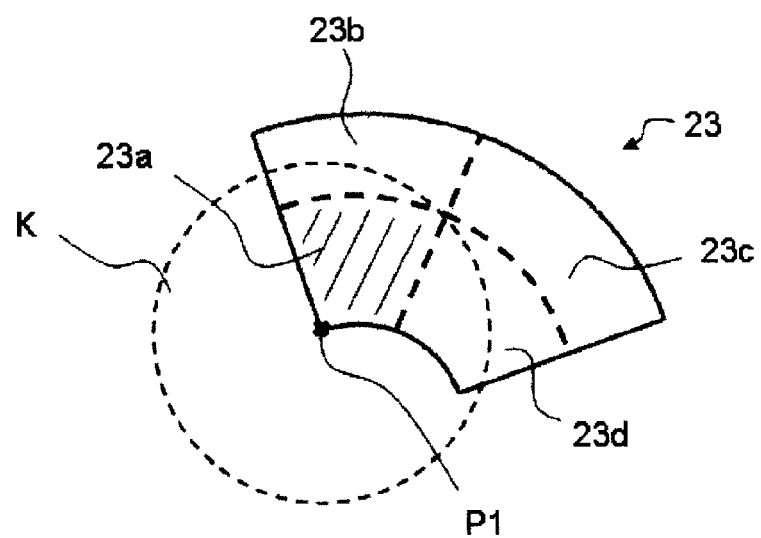
Figure 11:
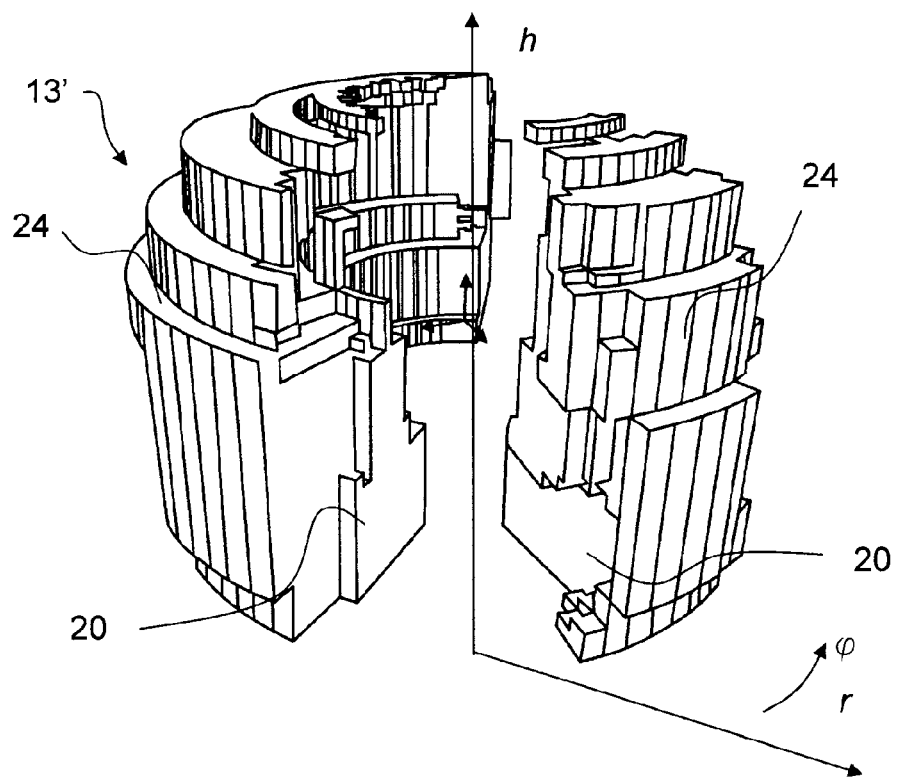
Figure 10:
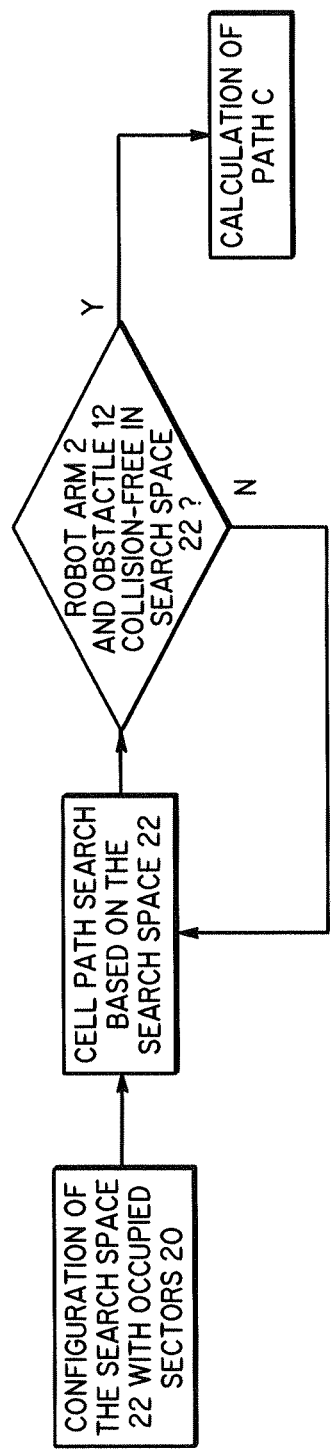

Examples of exemplary embodiments of the invention are depicted in the accompanying schematic figures. The figures show the following:

FIG. 1 an industrial robot having a control device and a robot arm,

FIG. 2 a cross section of a cylindrical model of the working space of the industrial robot while the latter is being constructed, FIG. 3 a segment of the cylindrical model, FIG. 4 additional cross sections of the cylindrical model in another construction step, FIG. 5 a three-dimensional view of the cylindrical model, FIG. 6 a three-dimensional view of the cylindrical model in another construction step, FIGS. 7-9 a segment of the cylindrical model, FIG. 10 a flow chart, and FIG. 11 a three-dimensional view of another cylindrical model of the working space of the industrial robot.

FIG. 1 shows a perspective view of an industrial robot 1 having a robot arm 2.

In the case of the present exemplary embodiment, robot arm 2 includes a plurality of members, arranged sequentially and connected by joints. The joints are in particular a stationary or movable base 3 und a carousel 4 that is mounted so that it is rotatable relative to base 3 around a vertical axis A1, which is also referred to as axis 1. Other joints of robot arm 2 in the case of the present exemplary embodiment are a motion link 5, an extension arm 6 and a preferably multiaxial robot hand 7 having a flange 8. Motion link 5 is mounted at its lower end on carousel 4, for example on a swivel bearing head that is not shown in further detail, so that it can swivel around a preferably horizontal axis A2, which is also referred to as axis 2. At the upper end of motion link 5, extension arm 6 in turn is mounted so that it can swivel around a likewise preferably horizontal axis A3. At its end this arm carries robot hand 7, with its preferably three axes A4, A5, A6.

In order to move industrial robot 1 or its robot arm 2, the latter includes drives, in particular electric drives, that are connected in a generally known way to a control device 9. Only some of the electric motors 10 of these drives are shown in FIG. 1.

In the case of the present exemplary embodiment, a gripper 10 that is connected to control device 9 in an unshown manner is attached to flange 8 of industrial robot 1. Accordingly, during operation of industrial robot 1, control device 9 or a computer program running thereon is able to activate the drives and gripper 10 in such a way that flange 8 and hence also gripper 10 execute a predefined motion, and using gripper 10 an object 11 may be grasped, moved by industrial robot 1 from a first location A to a second location B, for example along a path C, and deposited at second location B.

In the case of the present exemplary embodiment there is at least one obstacle 12 in the working space of the industrial object, with which object 11 is not supposed to collide while being moved by industrial robot 1. The motion of industrial robot 1 is also supposed to be executed in such a way that its robot arm 2 does not collide with obstacle 12. The working space of industrial robot 1 is that space which industrial robot 1 is at least theoretically able to reach with its gripper 10.

In the case of the present exemplary embodiment, a computer program runs on control device 9 which plans and subsequently executes the motion of industrial robot 1 using a path planning function.

In the case of the present exemplary embodiment, control device 9 is set up to create a three-dimensional model 13 of the working space of industrial robot 1. This has been or is created for example as follows:

First, in the Cartesian working space with the coordinates x, y, z (basic coordinate system) of industrial robot 1, a cylindrical search space 22 depicted in FIG. 2 as a cross section, having the dimensions or coordinates φ (angle), r (radius) and h (height), is erected around the center point of industrial robot 1 or its basic coordinate system. In particular the coordinate h of this cylindrical coordinate system coincides in the case of the present exemplary embodiment with axis A1, i.e., with that axis around which carousel 4 is rotatably mounted. The angle and radius coordinates φ, r of the cylindrical coordinate system or of cylindrical search space 22 are shown in FIG. 2.

In cylindrical search space 22, obstacle 12 and possibly additional obstacles are approximated by hollow cylindrical cells, sectors or segments 20, which are described using the cylindrical coordinates of the cylindrical coordinate system. A three-dimensional view of segment 20, which approximates obstacle 12, is shown in FIG. 3.

In the case of the present exemplary embodiment, industrial robot 1 is modeled with obstacle 12 and possibly other obstacles or objects as a three-dimensional CAD model; i.e., the so-called robot cell assigned to industrial robot 1 exists as a CAD model. Hence it is possible to model a search space 22 having segment 20 described in the cylindrical coordinate system around the obstacle 12 modeled in the CAD model, in particular by choosing segment 20 so that it completely encloses the obstacle 12 modeled in the CAD model. It is also possible, however, to model obstacle 12 using a plurality of hollow cylindrical or cylindrical segments 20. Consequently, one obtains in cylindrical search space 22 one or more segments 20 which indicate hollow cylindrical or cylindrical sectors or cells occupied by an obstacle 12. The remaining region 21 of this search space 22 is not occupied by an obstacle 12, and includes free cells, sectors or segments 23 which are likewise hollow cylindrical or cylindrical in shape. FIGS. 4a through 4c show possible breakdowns of the free region 21 into free segments 23 of cylindrical search space 22.

In each of the search spaces 20 depicted in FIGS. 4a through 4c two segments 20 are depicted, each of which is assigned to regions of search space 22 occupied by an obstacle 12.

In FIG. 4a, free region 21 is divided into seven segments 23. For the example shown in FIG. 4a, free region 21 is divided along angular coordinate φ of the cylindrical coordinate system.

In FIG. 4b, free region 21 is divided into a plurality of segments 23. For the example shown in FIG. 4b, free region 21 is divided along radius coordinate r of the cylindrical coordinate system.

In the example shown in FIG. 4c, free region 21 is divided along both angular coordinate φ and radius coordinate r of the cylindrical coordinate system.

Adding the height coordinates h produces three-dimensional cells, i.e., segments 23, whose proximity relationship may be summarized in a graph. It is also possible already in this proximity relationship to take into account axis boundaries and cells or Cartesian spaces prohibited a priori by the user. Any additional information may also be incorporated and taken into account in the subsequent planning.

FIG. 5 shows a perspective view of an example of a search space 22 having occupied cells or segments 23, which are occupied by obstacles 12.

Besides the segments 20 that are occupied by obstacles 12, the segments or cells of cylindrical search space 22 which industrial robot 1 is unable to reach with object 11 grasped by gripper 10 may be ignored.

To further refine cylindrical search space 22, in the case of the present exemplary embodiment the following additional step is carried out:

Using a computer program running on control device 9, the system then simulates which of the free segments 23 industrial robot 1 is able to traverse with object 11 without robot arm 2 colliding with one of the obstacles 12. This simulation is based on search space 22 with segments 20 already occupied. This simulation results in segments 24, for which there would be a collision of obstacles 12 with robot arm 1. The model produced is model 13, which is shown in FIG. 6.

Based on model 13, in the case of the present exemplary embodiment the motion of industrial robot 1 is planned with the aid of a computer program running on control device 9. Based on the plan, industrial robot 1 then moves in such a way that object 11 moves along path C from first location A to second location B.

In the case of the present exemplary embodiment, path C is planned on the basis of a so-called A* search within search space 22 or model 13, for example in order to find the shortest or most cost-effective cell path or segment path. Path C is then computed from this cell path or segment path, for example using point-to-point calculation. This calculation, which is thus based on model 13, guarantees collision-free motion of object 11 along path C. Smoothing may also be used for calculating path C from the cell path or segment path, for example in order to obtain the largest possible smoothed contour.

In the case of the present exemplary embodiment, cells or segments 22, 23, 24 may thus have the following five states in search space 22 or model 13:

Due to the design of robot arm 2, cells or sectors or segments of search space 22 may be unreachable ("OUT OF REACH").

The cell is occupied by an obstacle 12 (segments 20).

Robot arm 2 would collide with obstacle 12 (segments 24).

A cell or segment could be subdivided further. This is optional.

The cell is unoccupied or free (segment 23).

In the case of the present exemplary embodiment, in a collision check a differentiation is accordingly made between a collision of object 11 with obstacle 12 and a collision of robot arm 2 with obstacle 12. In the collision check of object 11 and obstacle 12, it is determined in particular whether the segment 23 in question is able to accommodate object 12 completely. This is solved in particular geometrically, as illustrated for example by FIG. 7.

In the check for collisions of robot arm 2 and obstacle 12, the methods used may include the following: sampling-based method and adaptive method.

With both methods of collision testing, for example a plurality of positions are determined for object 11 in an initially free segment 23, and are moved to in a simulation running for example on control device 9.

The sampling-based method is depicted in FIG. 8. For the collision test, a plurality of positions 25 of object 11 are specified within the relevant segment 23 and the corresponding robot arm positions are simulated. If a collision of robot arm 2 with obstacle 12 results for at least one of these positions 25, the corresponding free segment 23 is identified as a cell or segment 24 in which a collision of robot arm 2 with obstacle 12 would result when object 11 passes through it.

For the sampling-based method, in particular the robot arm position is simulated in such a way that object 11 occupies the simulated positions 25. For example, with the aid of a collision detection library the collision check may be performed in particular as a Boolean collision check. If all the simulated positions 25 are collision-free, it is concluded therefrom that the complete segment 23 is collision-free. This cannot be absolutely guaranteed, however, because a relatively small obstacle 12 for example might have been missed.

An advantage of the sampling-based method is its relatively fast execution, because no computation-intensive distance calculations have to be performed, but only collision checks at a certain distance (step by step). However, in this case the freedom from collisions cannot be guaranteed with 100 percent probability, regardless of how densely cell or segment 23 is sampled.

With the adaptive method, on the other hand, distance information is used to mark parts of a segment 23 as guaranteed collision-free. That procedure is continued until either the entire segment 23 has been proven collision-free or a part of the segment remains that one does not wish to divide further (implementation details), so that this part of the segment is declared to be subject to collision. This is illustrated in FIG. 9.

For the adaptive method, the robot arm position is first simulated so that object 11 is located at point P1. Next, the minimum distance between the robot geometry and the obstacle or obstacles 12 in search space 22 are determined. Object 11 is in particular part of the simulated robot geometry. For example, a collision and distance calculating library may be used. Each point on the robot geometry may now move at most by this minimum distance, which is depicted schematically in FIG. 9 as a circle or sphere K for a three-dimensional application. The enclosed area 23a of segment 23 is collision-free. A further subdivision of segment 23 produces sub-segments 23b, 23c and 23d, which are now further analyzed in the same way (iterative method with termination condition).

After the complete cell structure or segment structure is constructed, i.e., model 13 exists in cylindrical coordinates according to FIG. 6 and possibly proximity relationships have been included in a cell graph or segment graph, graph algorithms may be applied thereto, for example the A* algorithm for determining in particular a cost-optimized path through the graph, whose vertices have been assigned to costs. It is possible for example to define any heuristic functions for the costs along the vertices; for example, the Cartesian distance may be implemented as a cost function and the Manhattan distance may be implemented for the number of point-to-point motions along the cylindrical dimensions (r, h, $\phi$).

The result of this A* search is a sequence of free segments 23 through the segment structure, through which industrial robot 1 may move object 11. This sequence is designated as a cell path or segment path, and serves to maintain path C.

In the case of the present exemplary embodiment, in an additional calculation step a point-to-point path for industrial robot 1 is assembled from the cell path or segment path that has been found. The point-to-point path is path C, on which object 11 is to move. At the same time, in the case of the present exemplary embodiment, it is ensured that object 11 does not leave any free segments 23 while moving along path C, in order to prevent a collision with an obstacle 12.

It may also be provided, for the calculation of path C, to smooth the point-to-point path in a follow-up step, for example by skipping cells or sectors or segments that are being traversed unnecessarily and deleting them from the path.

For example, if two adjacent segments 23 are traversed in the cp direction, then this corresponds to a point-to-point motion around axis A1; when proceeding in the r and/or h direction it corresponds to a point-to-point motion with axes A2 and A3. In the case of the present exemplary embodiment, axes A4-A6 of robot hand 7 are traversed in such a way that the preferred orientation for object 11 is just maintained, i.e., object 11 changes only its position, but not its orientation, while moving along path C.

If the Manhattan distance is used for example as a cost function, then it may be that not enough points per path C are calculated, so that in this case a further improvement in terms of cycle time is possible in addition by calculating for example the maximum smoothed distance.

It is also possible to smooth a determined point-to-point path for path C. That makes it possible to speed up the cycle time, and thus to traverse path C more rapidly. But in this case care should be taken to ensure that path C remains collision-free, i.e., that neither object 11 nor robot arm 2 collides with obstacle 12.

It is also possible to delay the calculation of the relatively time-intensive collision checks until they are absolutely necessary. In the present exemplary embodiment, this means the collision checks for robot arm 2, i.e., the determination of sectors 24. Consequently, segments 24, i.e., those segments 24 for which a collision of robot arm 2 with obstacle 12 would occur if they were traversed by the object, cannot be determined until the initially free segment 23 to be analyzed appears in the segment path and potentially is to be traversed. This is summarized in FIG. 10.

Accordingly, in this variant a complete cell division or segment division of search space 20 is not calculated in the preprocessing step, but rather is only updated gradually with the information pertaining to the collision freedom of segments 23 in the segment path.

In the case of the present exemplary embodiment, the orientation of object 11 remains constant while it moves along path C. In addition, the occupied segments 20, 24 are determined on the basis of the current orientation of object 11.

In one embodiment, it may however also be provided that industrial robot 1 changes the orientation of object 11 while object 11 moves along path C. In this case, for both orientations, or if more than two orientations are provided then for each of the orientations of object 11, a search space 20 assigned to the particular orientation and then the corresponding segments 24 which are assigned to a collision of robot arm 2 and obstacle 12 are determined.

In the case of the exemplary embodiment shown in FIG. 1, object 11 is oriented so that it has a greater horizontal extension than vertical. The model 13 assigned to this orientation of object 11 is shown in FIG. 6.

If object 11 for example is now rotated by 90° for example while moving along path C, control device 9 for example is able to determine another model 13', which is computed corresponding model 13 but takes into account the changed orientation of object 11. A different segment division of search space 22 and accordingly of model 13' then results, as shown in FIG. 11.

A reorientation from the one orientation of object 11 to the other may then be performed in sufficiently large and free segments 23. To that end, these segments 23 are then joined together in the two segment disassemblies for example by vertices in the search graph.

A step-by-step reorientation with the aid of intermediate positions is also conceivable, for example in the event that a direct reorientation of object 11 from the starting pose at first location A to the ending pose at second location B is not possible. To that end a plurality of cell structures are calculated as needed, namely for each stage exactly one disassembly per object coordinate axis.

It may be possible to save disassemblies due to symmetry properties of object 11.

In particular, there is provision to reorient object 11 during the motion along path C in a free segment 23 which is able to accommodate a sphere whose dimension, i.e., radius, is chosen large enough so that it completely encloses object 11. It is then possible for any desired reorientation of object 11 to be performed in this segment, and thus to jump to any disassembly during the planning.

The invention claimed is:

1. A method for planning a collision-free path for moving an object using an industrial robot having a robot arm controlled by a control device, wherein a working space of the robot includes at least one obstacle, the method comprising:
   creating a three-dimensional model of the working space of the industrial robot in cylindrical coordinates;
   modeling the at least one obstacle in the three-dimensional model as at least one hollow cylindrical first segment;
   dividing the region of the three-dimensional model that is not occupied by the first segment into a plurality of cylindrical second segments; and
   determining a path along which the industrial robot is to move the object from a first point to a second point using the three-dimensional model, wherein the path is determined such that the object is moved exclusively within a region of the working space corresponding to the second segments, wherein the object is moved along at least a first portion of the path with the object in a first orientation, and wherein the object is moved along at least a second portion of the path with the object in a second orientation different than the first orientation.

2. The method of claim 1, further comprising:
   locating an origin of a cylindrical coordinate system for the cylindrical coordinates of the model at an origin of the basic coordinate system of the industrial robot.

3. The method of claim 2, wherein the robot includes a base, a carousel mounted on the base for rotational movement about a vertical axis, a motion link pivotally coupled with the carousel, an extension arm pivotally coupled with the motion link, and a robot hand coupled with the extension arm, the robot hand including a flange for supporting the object, the method further comprising:
   locating a vertical axis of the cylindrical coordinate system to coincide with the vertical axis of the robot about which the carousel rotates.

4. The method of claim 1, further comprising:
   simulating in the three-dimensional model positions of the robot arm that correspond to positions of the object in the second segments;
   determining which second segments in the three-dimensional model are segments where a collision of the robot arm with the obstacle could occur; and
   identifying the second segments for which a collision of the robot arm with the obstacle could occur as third segments.

5. The method of claim 1, further comprising:
   determining a segment path by selecting adjacent second segments between the first point and the second point; and
   calculating the path based on the determined segment path.

6. The method of claim 1, wherein the path is determined such that the object is moved along the path without changing an orientation of the object.

7. The method of claim 1, further comprising:
   creating a first three-dimensional model for moving the object along the path in the first orientation; and
   creating a second three-dimensional model for moving the object along the path the second orientation.

8. The method of claim 7, further comprising:
   planning a rotation of the object from the first orientation to the second orientation;
   wherein the object is rotated from the first orientation to the second orientation in a region of the working space corresponding to at least one second segment, such that the at least one second segment is large enough for the object to rotate from the first orientation to the second orientation within the at least one second segment without leaving the at least one second segment.

9. An industrial robot, comprising:
   a robot arm including a robot hand having a flange for supporting an object to be moved with the robot arm; and
   a control device controlling the robot arm for movement of the object from a first point to a second point within a working space of the robot arm that includes at least one obstacle;
   the control device planning a path for moving the object from the first point to the second point by:
      creating a three-dimensional model of the working space of the industrial robot in cylindrical coordinates,
      modeling the at least one obstacle in the three-dimensional model as at least one hollow cylindrical first segment,
      dividing the region of the three-dimensional model that is not occupied by the first segment into a plurality of cylindrical second segments, and
      determining a path along which the industrial robot is to move the object from a first point to a second point using the three-dimensional model, wherein the path is determined such that the object is moved exclusively within a region of the workspace corresponding to the second segments, wherein the object is moved along at least a first portion of the path with the object in a first orientation, and wherein the object is moved along at least a second portion of the path with the object in a second orientation different than the first orientation.

10. A method for planning a collision-free path for moving an object using an industrial robot having a robot arm controlled by a control device, wherein a working space of the robot includes at least one obstacle, the method comprising:
   creating a three-dimensional model of the working space of the industrial robot in cylindrical coordinates;
   modeling the at least one obstacle in the three-dimensional model as at least one hollow cylindrical first segment;
   dividing the region of the three-dimensional model that is not occupied by the first segment into a plurality of cylindrical second segments;
   simulating in the three-dimensional model positions of the robot arm that correspond to positions of the object in the second segments;
   determining which second segments in the three-dimensional model are segments where a collision of the robot arm with the obstacle could occur;
   identifying the second segments for which a collision of the robot arm with the obstacle could occur as third segments; and determining a path along which the industrial robot is to move the object from a first point to a second point using the three-dimensional model, wherein the path is determined such that the object is moved exclusively within a region of the working space corresponding to the second segments.

* * * * *

UNITED STATES PATENT AND TRADEMARK OFFICE
CERTIFICATE OF CORRECTION

| | | |
|---|---|---|
| PATENT NO. | : 8,914,152 B2 | Page 1 of 1 |
| APPLICATION NO. | : 13/018493 | |
| DATED | : December 16, 2014 | |
| INVENTOR(S) | : Christian Scheurer et al. | |

It is certified that error appears in the above-identified patent and that said Letters Patent is hereby corrected as shown below:

In the Specification:

Column 4,
Line 30 reads "or movable base 3 und a carousel 4" and should read -- or movable base 3 and a carousel 4 --.

Column 7,
Lines 30-31 read "minimum distance between . . . are determined" and should read -- minimum distance between . . . is determined --.

In the Claims:

Claim 7, Column 10,
Lines 7-8 read "creating a second three-dimensional model for moving the object along the path the second orientation" and should read -- creating a second three-dimensional model for moving the object along the path in the second orientation --.

Signed and Sealed this
Ninth Day of June, 2015

Michelle K. Lee
*Director of the United States Patent and Trademark Office*